United States Patent [19]

Roslonski

[11] Patent Number: 5,230,809
[45] Date of Patent: Jul. 27, 1993

[54] METHOD AND APPARATUS FOR DEWATERING SLUDGE MATERIALS

[76] Inventor: Donald Roslonski, 2424 Bridge Ave., Point Pleasant, N.J. 08742

[21] Appl. No.: 849,586

[22] Filed: Mar. 11, 1992

[51] Int. Cl.$^5$ .................. B01D 35/06; C02F 11/12; C02F 11/14
[52] U.S. Cl. .................. 210/748; 210/205; 210/243; 210/400; 210/401; 210/746; 210/749; 210/770; 210/783; 204/149; 204/152
[58] Field of Search ............... 210/609, 746, 748, 770, 210/783, 216, 400, 401, 408, 205, 206, 251; 204/149, 152

[56] References Cited

U.S. PATENT DOCUMENTS

| | | | |
|---|---|---|---|
| 3,381,609 | 5/1968 | Malarkey, Jr. | 210/401 |
| 3,962,069 | 6/1976 | Inoue et al. | 210/748 |
| 4,101,400 | 7/1978 | Pepping | 210/748 |
| 4,367,132 | 1/1983 | Bell et al. | 210/748 |
| 4,655,932 | 4/1987 | Roslonski | 210/243 |
| 4,755,305 | 7/1988 | Fremont et al. | 210/748 |
| 4,861,496 | 8/1989 | Diaz | 210/748 |
| 4,971,705 | 11/1990 | Roslonski | 210/748 |

Primary Examiner—Stanley S. Silverman
Assistant Examiner—Neil M. McCarthy
Attorney, Agent, or Firm—Clifford G. Frayne

[57] ABSTRACT

A method and apparatus for the removal of water, liquids and liquors from sludges and slurries, the sludges and slurries mixed with an electrolyte to improve conductivity and introduced into a conveyor chamber where an electrical path is established to permit electrical energy to pass through the conveyor chamber and the sludge, slurry and electrolyte to free bound water and remove it from the sludge or slurry, and to heat the sludge or slurry to drive off remaining water by vaporization.

16 Claims, 4 Drawing Sheets

METHOD AND APPARATUS FOR DEWATERING SLUDGE MATERIALS

FIELD OF INVENTION

The method and apparatus claimed herein relates to the removal of water, liquids or liquors from sludges or slurries by means of cellular and intracellular filtration to the percentage extent such that they can be characterized as solids for recycling and landfill disposal, including those sludges or slurries having toxic or hazardous materials contained therein.

BACKGROUND OF THE INVENTION

Municipalities and industries are faced with significant problems of treating solid and liquid waste and disposing of same without any detrimental effects to the surrounding environment. This problem is complicated in that the characteristics of sludges generated by various industrial processes vary greatly in their content, thus making dewatering of these sludges more complicated. The problem is further complicated in that in many industrial processes, certain toxic substances are generated which are found in the sludge together with normal pathogens and microorganisms which must be neutralized and stabilized. Certain Federal requirements require each industrial point source to identify the outflow of substances from the industrial process and in many instances, depending upon the content of such outflow, the industrial processor is required to take certain steps to remove these toxic or hazardous substances.

Applicant is the holder of U.S. Pat. No. 4,655,932 for a method and apparatus for the disintegration and destruction of hazardous and toxic sludge materials.

The Applicant has further refined the aforesaid process with reference to the dewatering of filter cake generated by water companies in the treatment of their water sources prior to the introduction of the water into the distribution system. This filter cake or sludge generated by water companies is of particular complexity with respect to dewatering as a result of the processes and the chemicals which the water is subjected to in its treatment prior to introduction into the water system. Applicant's method and apparatus is able to achieve a greater degree of dewatering with respect to this type of sludge than previously accomplished in the industry and at the same time, Applicant's method and apparatus will have application to other types of sludges generated by different industrial processes.

OBJECTS OF THE INVENTION

An object of the present invention is to provide for a novel and continuous method for the substantial removal of water, liquids or liquors from sludge or slurry streams.

A further object of the present invention is to provide for a novel continuous method for the removal of water, liquids or liquors from sludge or slurry streams by means of cellular and intracellular filtration.

A further object of the present invention is to provide for a novel method for the substantial removal of water, liquids and liquors from sludge or slurry streams and the simultaneous neutralization of toxic substances contained therein and to also raise the temperature to 180-200° F. thereby destroying micro-organisms and pathogens in organic sludges.

A further object of the present invention is to provide for a novel continuous method for the substantial dewatering or deliquifying of sludge materials to a degree greater than that previously achieved.

SUMMARY OF THE INVENTION

These and other objects of the present invention are achieved by a process whereby a sludge or slurry stream is analyzed and blended with an electrolyte in order to enhance the conductivity of the sludge stream, the sludge stream then being introduced into a hopper where the sludge stream would be transported by opposing sides of the hopper comprised of conveyor belts which would transport the sludge stream, the conveyor belts being of woven conductive material for contact with the outer periphery of the sludge stream, the conveyor belt in communication with either (a) an electrified skid plate, a source of electrical energy being applied to the skid plate and to the conveyor belt such that an electrical path is established through the sludge stream as a result of the added electrolyte, the electrical path will drive out most bound water/liquor and will generate heat as a by-product. to drive off water or liquors or (b) an electromagnetic field generates about a nonconductive conveyor belt, the electromagnetic field polarizing the water or liquors and removing them from the sludge stream such that substantially dewatered sludge results, the end product being substantially composed of solid material suitable for recycling or landfill disposal.

BRIEF DESCRIPTION OF THE DRAWINGS

A better understanding of the present invention as well as other objects and advantages thereof will become apparent upon consideration of the detailed disclosure thereof, especially when taken with the accompanying drawings wherein.

DETAILED DESCRIPTION OF THE DRAWINGS

Figure 1:
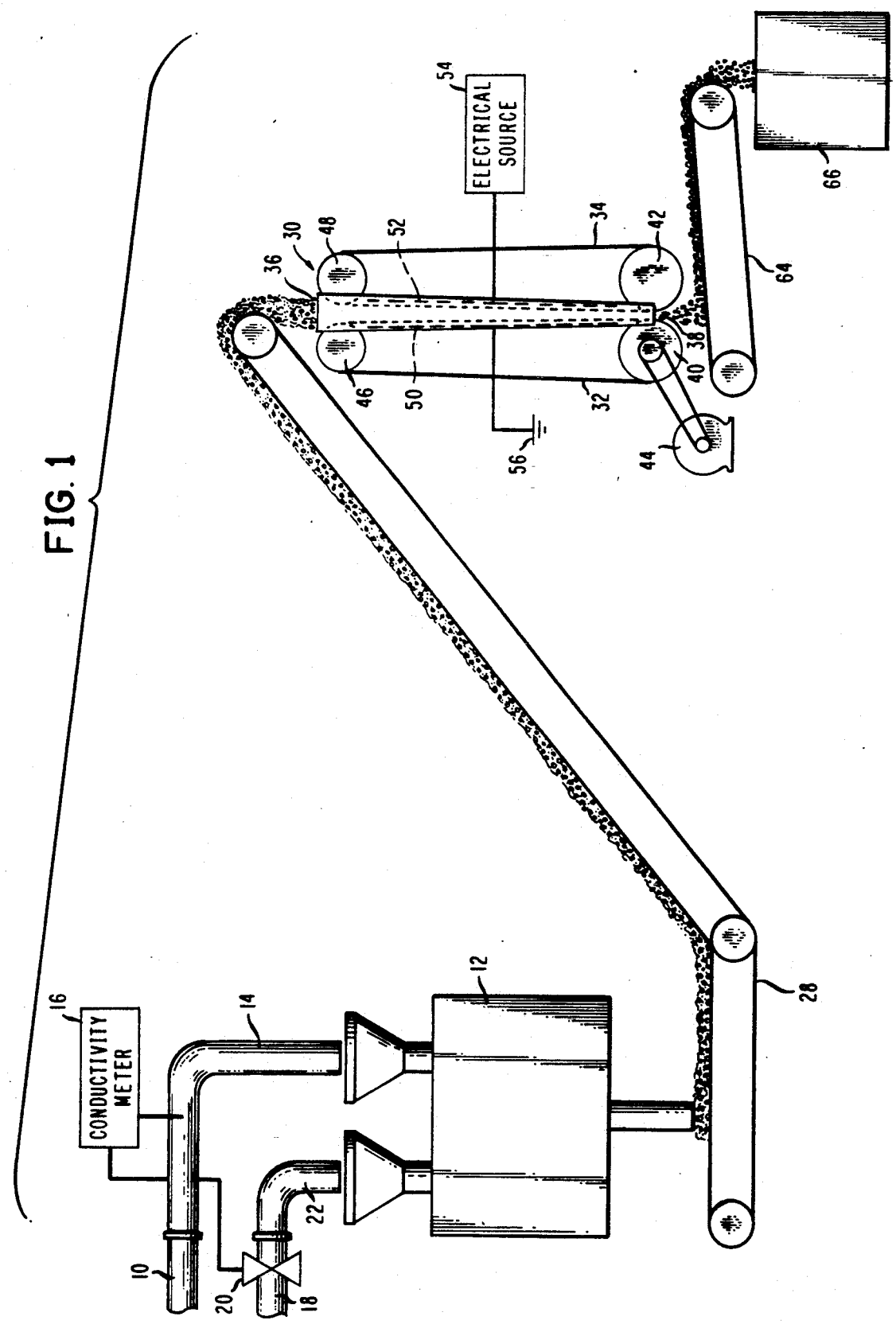
FIG. 1 is a side elevational schematic view of the continuous process for dewatering sludge.

FIG. 1 illustrates a side elevational schematic view of a first embodiment for the improved apparatus and method for dewatering sludge. The sludge 10 is introduced into a mixing chamber 12 by means of conduit 14. In the process of introducing sludge 10 into chamber 12, the conductivity of the sludge is measured by a conductivity meter 16. The conductivity of the sludge 10 is adjusted by means of the introduction of electrolyte 18 into mixing chamber 12, the amount of electrolyte 18 being automatically adjusted by means of feedback from conductivity meter 16 in conjunction with valve 20 in electrolyte line 22.

The electrolyte and sludge are mixed in chamber 12 by any conventional means and then introduced onto a conveyor means 28. Conveyor means 28 transports the sludge and electrolyte 10 and 18 to a dewatering belt system 30. In the embodiment illustrated in FIG. 1, dewatering belt system 30 is positioned in a vertical arrangement. Dewatering belt system 30 is comprised of two continuous belts 32 and 34 mounted in a converging arrangement such that the opening between belts 32 and 34 at its uppermost position 36 is greater than the opening 38 between belts 32 and 34 at their lowermost position. Belts 32 and 34 are driven by drive rollers 40 and 42 which in turn are driven by a motor 44. Belts 32 and 34 extend about drive rollers 40 and 42, respectively and idler rollers 46 and 48, respectively. As will be described in more detail hereafter, belts 32 and 34 are comprised of a flexible conductive material having perforations throughout its surface.

Belts 32 and 34 are driven by drive rollers 40 and 42 such that belts 32 and 34 are driven downwardly from idler rollers 46 and 48 to converge in opening 38. In moving downwardly as such, the conductive belts 32 and 34 are in contact with a slider plate 50 and 52, respectively. Slider plate 52 is in contact with a generator or other source of electrical energy 54 and slider plate 52 is in contact with a ground 56.

The purpose of slider plate 52 is to transmit electrical energy received from generator 54 to conductor belt 34 which is in intimate contact with the sludge being fed into the top of the dewatering assembly 30. The electrolyte and the sludge enhances the conductivity of the sludge and the electrical energy flows from slider plate 52 through belt 34, through the sludge and electrolyte mixture to belt 32 which is in intimate contact with slider plate 50 and thence to a ground. The amount of electrical energy required is dependent upon the conductivity of the sludge and the quantity of the sludge throughput. The electrical energy transmitted drives out a substantial amount of free water or liquid. The remaining moisture is then heated sufficiently to cause vaporization. Temperatures generated will normally not exceed 200° F. This vaporized water is released upwardly out of opening 36 or exits through perforations in belts 32 and 34 with free water and is collected by means of drains 60 positioned proximate to drives 40 and 42. The unique structure of the dewatering belt system 30 will be better understood with reference to FIGS. 2, 3 and 4.

Figure 2:
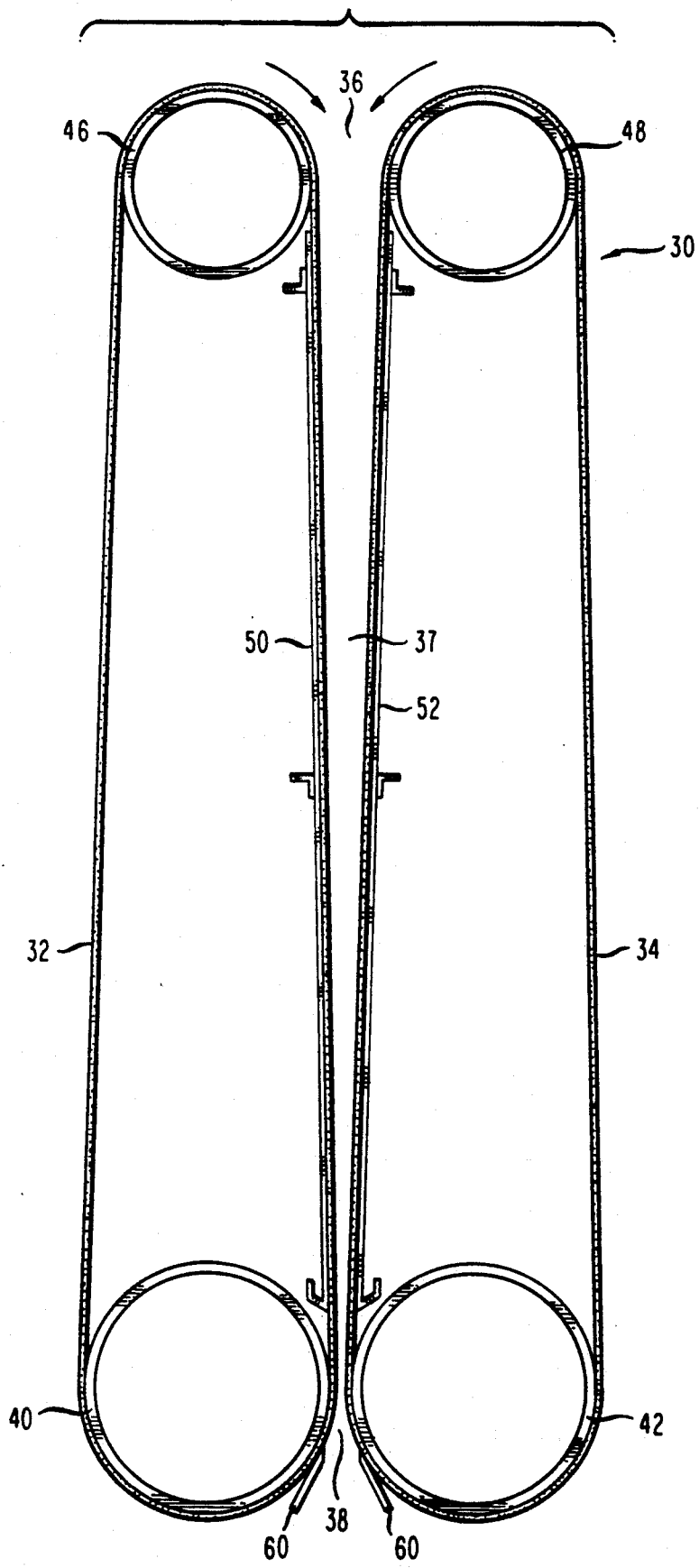
FIG. 2 is a side view of the continuous conveyor system for dewatering sludge.

FIG. 2 is an enlarged side view of dewatering belt assembly 30. In the preferred embodiment, the center of drive wheel 40 and the center of idler wheel 46 are in vertical alignment with the radius of idler wheel 46 being less than the radius of drive wheel 40. The same holds true with respect to the relationship between the drive wheel 42 and idler wheel 48. Belts 32 and 34, respectively, are positioned about their respective drive wheel and idler wheels 40 and 46 and 42 and 48. This arrangement results in an opening 36 between idler wheels 46 and 48 of a greater dimension than the opening 38 between drive wheels 40 and 42.

Belts 32 and 34 are constructed of a conductive flexible material and the outer cylindrical circumference of drive wheels 40 and 42 and idler wheels 46 and 48 are constructed of a non-conductive material. In the embodiment as shown, belt 34 as it travels downwardly from idler wheel 48 to drive wheel 42 within passageway 37 contacts a slider plate 52. Slider plate 52 is constructed of a conductive material and is in communication with a source of electrical energy such as a generator or similar power source.

Conductive belt 32 which rotates in an opposing direction from belt 34 contacts slider plate 50 which is mounted similar to slider plate 52. Slider plate 50 is in communication with a ground. In this configuration, the sludge and electrolyte is fed into passageway 37 at opening 36 and is dragged downwardly by conductive belts 32 and 34 while electrical energy is simultaneously transferred from the generator, to the slider plate 52, to belt 34, to the sludge and electrolyte mixture, and thence to belt 32 and slider plate 50. This transfer heats the sludge and drives off free water and water vapor through opening 36 as well as condensed liquid through the perforation in belt 32 and 34. The dried sludge exits opening 38 at the bottom of dewatering assembly 30. Non-conductive insulated scrapers 60 are positioned proximate to opening 38 in order to remove any dried sludge which may be adhering to belts 32 and 34, respectively. The dried sludge as illustrated in FIG. 1 exits openings 38 and is fed onto another transport mechanism, in this case, another conveyor belt 64 where it is then transported to a container or receptacle 66 for disposal.

Figure 3:
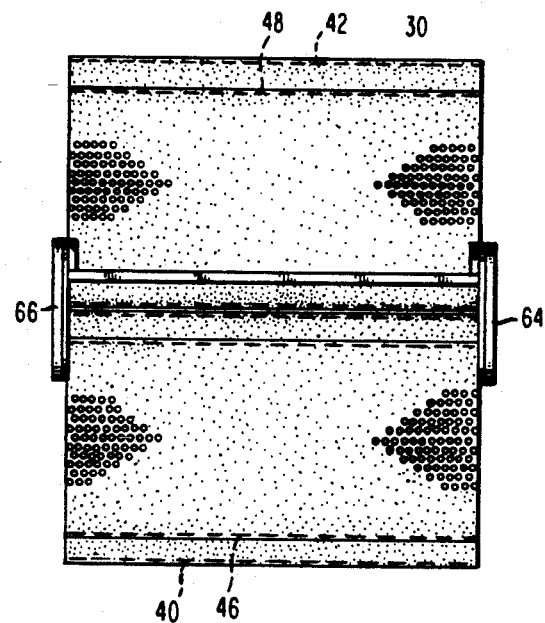
FIG. 3 is a top view of the dewatering system.

FIG. 3 is a top view of dewatering belt system 30 illustrating drive rollers 40 and 42 and idler rollers 46 and 48. The sludge 10 and electrolyte mix 18 which is introduced through opening 36 between idler rollers 46 and 48 and which exits through opening 38 between drive rollers 40 and 42 is maintained within passageway 37 between conductive belts 32 and 34 by means of a pair of side plates 64 and 66 which are constructed of a non-conductive material and which can be mounted if so desired on the axis of idler rollers 46 and 48 and drive rollers 40 and 42.

Figure 4:
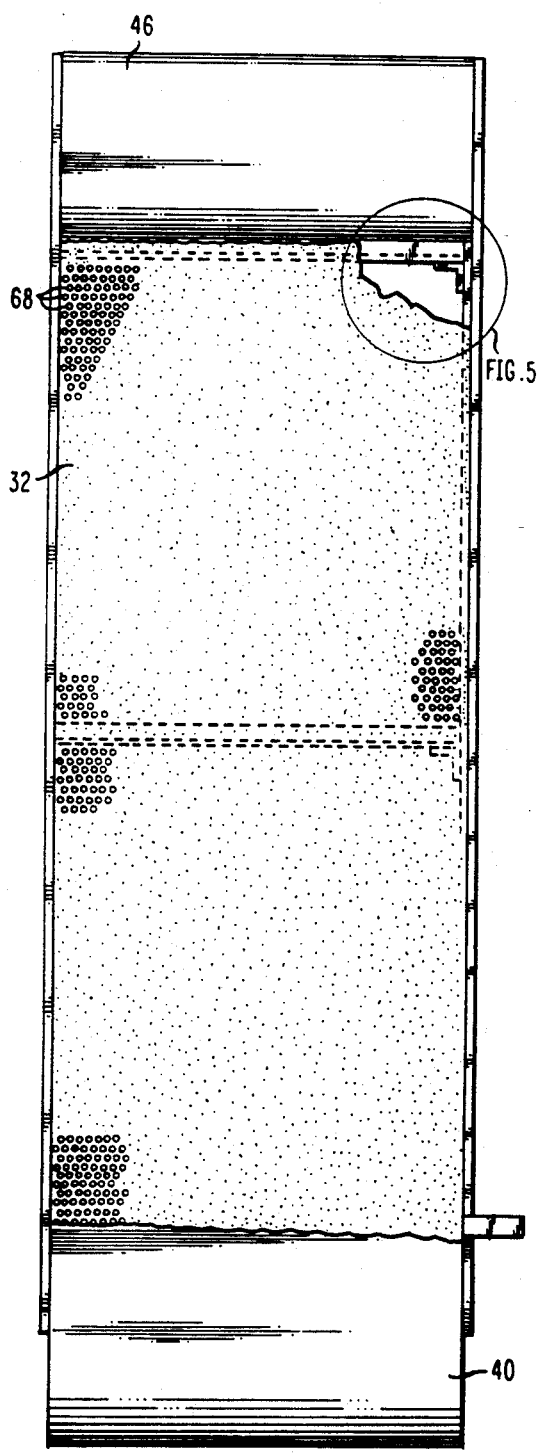
FIG. 4 is a front view along plane 3-3 of FIG. 3 of one of the continuous conveyors for dewatering sludge.

FIG. 4 is a front view illustrating conductive belt 32 mounted on idler roller 46 and drive roller 40. Belt 32 is constructed of a conductive material and has a perforated surface such as a chain link surface defining a plurality o, openings 68.

Figure 5:
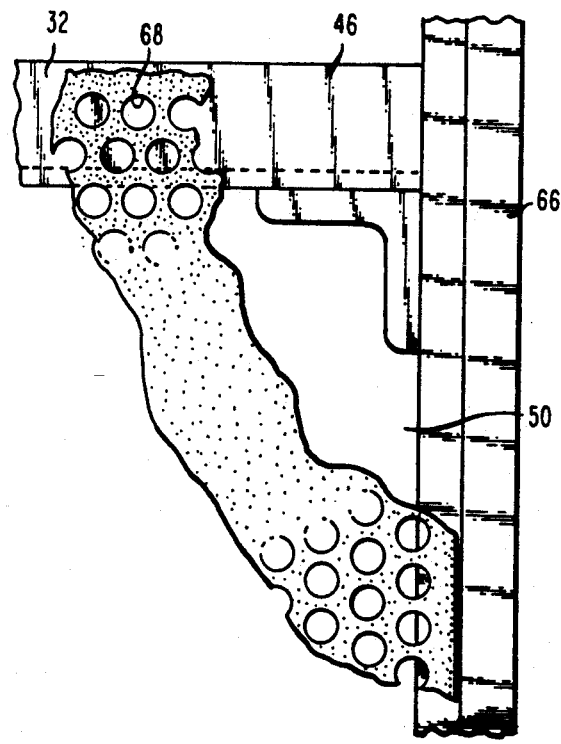
FIG. 5 is a partial enlarged view of the conveyor mechanism.

The enlarged area identified in FIG. 4 is illustrated in FIG. 5 which is a partial enlarged view identifying conductive belt 32 and the perforations or openings 68. Conductive belt 32 passes over idler roller 46 and then as it passes downwardly, contacts slider plate 50 which is mounted between drive roller 40 and idler roller 46 and behind conductive belt 32 as it moves downwardly from idler roller 46 to drive roller 32 in passageway 37. Side plate 66 is positioned as illustrated in FIG. 5 to maintain the sludge and electrolyte mixture within passageway 37 so that the electrical energy from generator or power source 54 is conducted through the sludge and electrolyte mixture, the current path will therefore drive out bound water and generate heat as a by-product.

The embodiment illustrated in FIG. 1 positions dewatering belt system 30 in a vertical arrangement. In this vertical arrangement, the passage of sludge and slurry material through dewatering belt system 30 is aided by gravity. Tests have shown that the dewatering belt system 30 could also operate in a v-shaped, horizontal arrangement wherein the sludge and slurry would be fed into the dewatering belt system 30 at the end of dewatering belt system 30 where there is the greatest divergence between belts 32 34, with a narrowing of the distance between belts 32 and 34 as the sludge or slurry pass therethrough. This would ensure adequate contact of the sludge and slurry with belts 32 and 34 as the water, liquids or other liquors were driven from the sludge or slurry.

Figure 6:
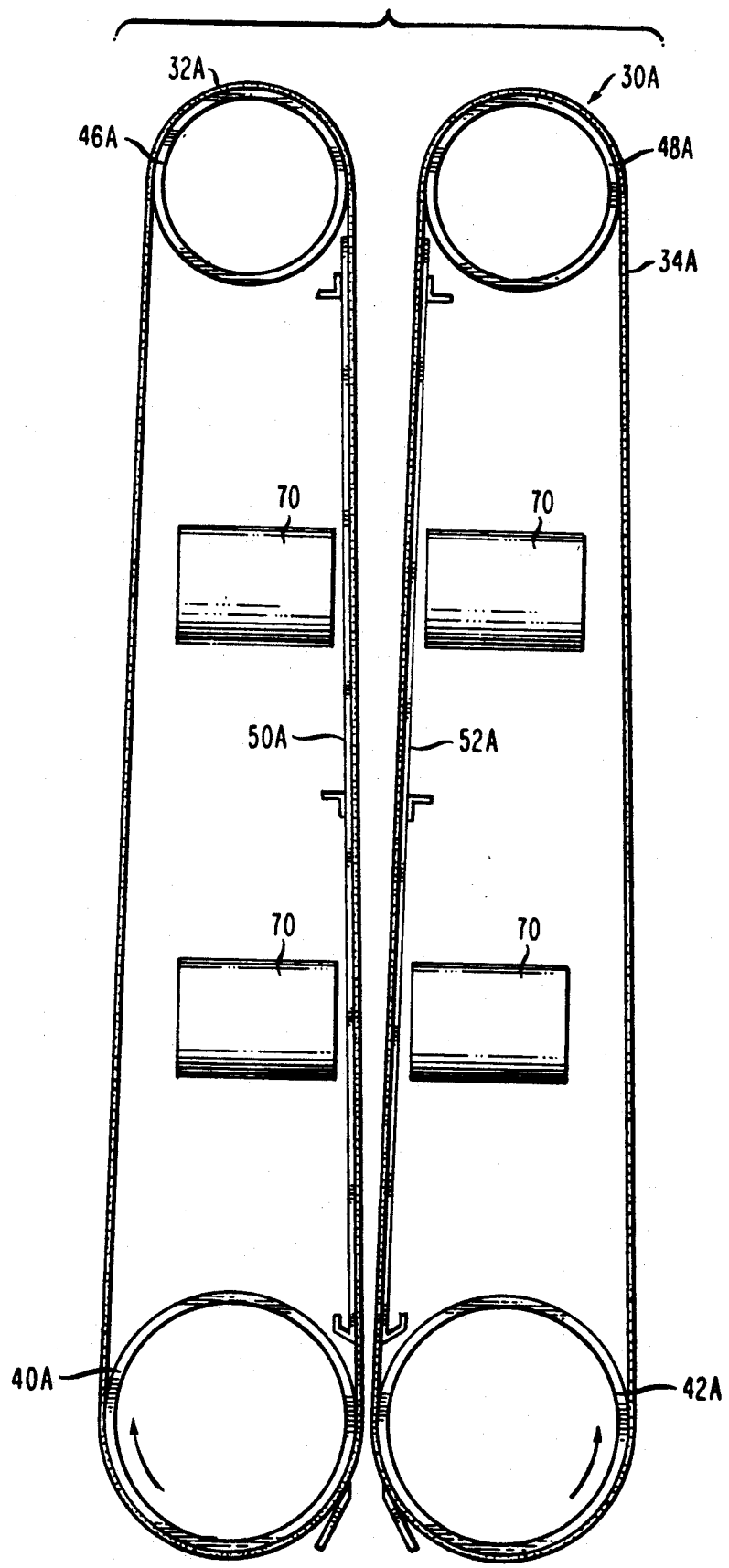
FIG. 6 is a side view of a second embodiment of a dewatering belt system.

A second embodiment of an apparatus and method for dewatering sludge is illustrated in FIG. 6. FIG. 6 is a side view of a dewatering belt system 30A. The sludge or slurry 10A, as illustrated in FIG. 6, would be treated with electrolyte in accordance with the same procedures as set forth with respect to the first embodiment. The sludge or slurry 10A would then be introduced into a dewatering belt system 30A wherein belts 32A and 34A would be positioned in converging arrangement. In this embodiment, belts 32A and 34A would be comprised of a porous nonmagnetic material and could be comprised of a woven cloth-like material. Belts 32A and 34A would rotate about drive rollers 40A and 42A and respective idler rollers 46A and 48A. Slider plates 50A and 52A are positioned adjacent the belts 32A and 34A in a manner identical to that disclosed in the first embodiment with the exception that in this embodiment, slider plates 50A and 52A are of a nonmagnetic material, but do have a plurality of perforations therethrough.

In this embodiment, the electrical energy source utilized to drive the water, liquid or liquors from sludge 10A through porous nonmagnetic belts 32A and 34A and through porous nonmagnetic perforated plates 50A and 52A is supplied by means of an electromagnetic field. This electromagnetic field in the form of electromagnets 70 would have opposing polarities on opposing sides of the belt system 30 so as to polarize the sludge and water and other liquors contained therein as a result of the electrolyte blended with the sludge or slurry so as to cause the water or liquor to migrate away from the sludge or slurry passing through the nonmagnetic belts 32A and 34A and nonmagnetic perforated plates 50A and 52A for collection.

The method and apparatus as disclosed herein results in the dewatering or removal of liquors and liquids from sludges in a percentage amount not heretofore attainable by conventional methods. Further, the method and apparatus can achieve efficiencies with respect to the amount of power utilized when compared to the amount of water, liquids or liquors removed.

While the present invention has been described with reference to the preferred embodiment thereof, it will be appreciated by those of ordinary skill in the art that various changes can be made in the process and apparatus without departing from the basic spirit and scope of the invention.

I claim:

1. An apparatus for the removal of bound water, liquids or liquors from sludges or slurries by means of electrical energy and an electrical path established through said sludges or slurries releasing said bound water, liquids or liquors and resulting in a volume reduction, and solids suitable for recycling or landfill disposal, the apparatus comprising:

a blending chamber for the blending of the sludge or slurry with a predetermined amount of electrolyte, said blending chamber having an inlet means for the introduction of electrolyte and sludge and an outlet means;

a dewatering chamber having an inlet means for the introduction of sludge and electrolyte and an outlet means, said dewatering chamber comprised of nonconductive parallel end walls and conductive convergent sidewalls, said convergent sidewalls converging from said inlet means to said outlet means of said dewatering chamber, said convergent sidewalls comprising first and second independently rotating endless conveyor belts in sealing engagement with said parallel end walls, said conveyor belts rotating in opposing directions so as to transport said sludge and electrolyte through said dewatering chamber from said inlet means to said outlet means, said first conveyor belt having a slider plate means for communication with a source of electrical energy, said second conveyor belt having a slider plate means for communication with an electrical ground, thereby defining an electrical path from said source of electrical energy to said electrical ground, through said conveyor belts and said sludge and electrolyte;

a motor means in operable communication with said convergent sidewalls to rotate said endless conveyor belts.

2. An apparatus in accordance with claim 1 wherein said parallel end walls ,nd said convergent sidewalls of said dewatering chamber define a substantially-rectangular inlet means and outlet means of said dewatering chamber, said outlet means of said dewatering chamber having a cross-sectional area less than the cross-sectional area of said inlet means, said first and second conveyor belts of said convergent sidewalls rotational in a downwardly-descending mode within said dewatering chamber.

3. An apparatus in accordance with claim 1 wherein said means for communication with said source of electrical energy comprises a slider plate, positioned in adjacent conductive contact with an underside of a downwardly-descending portion of one of said conveyor belts.

4. An apparatus in accordance with claim 1 wherein said slider plates are perforated having a plurality of apertures therethrough to facilitate the passage of liquid therethrough.

5. An apparatus in accordance with claim 1 wherein the surface of said first conveyor belt and the second conveyor belt are uneven and porous to facilitate the movement of sludge and electrolyte through said dewatering chamber and the movement of liquid through said conveyor belt.

6. An apparatus in accordance with claim 1 wherein said first conveyor belt and said second conveyor belt are comprised of a chain link material having a plurality of apertures therethrough.

7. An apparatus in accordance with claim 1 wherein said outlet means of said dewatering chamber has positioned proximate thereto, a catch basin for accumulation of liquids passing through said first and second conveyor belts and said first and second slider plates.

8. An apparatus in accordance with claim 1 wherein said dewatering chamber has a condenser positioned proximate to said inlet means for capture of vapor evaporated from said sludge or slurry.

9. An apparatus in accordance with claim 1 wherein said dewatering chamber is positioned in a vertical configuration with said sludge and electrolyte entering said inlet means and passing downwardly through said dewatering chamber under the influence of gravity and said first and second conveyor belts, said dewatered sludge exiting said outlet means.

10. An apparatus in accordance with claim 1 wherein said dewatering chamber is positioned in a horizontal configuration, said electrolyte and sludge entering said dewatering chamber through said inlet means passing through said dewatering chamber through the action of said convergent sidewalls, exiting said outlet means.

11. An apparatus in accordance with claim 1 wherein said distance between said convergent sidewalls of said dewatering chamber is adjustable.

12. An apparatus in accordance with claim 1 wherein said source of electrical energy is adjustable in accordance with conductivity of the sludge and electrolyte mix entering the dewatering chamber.

13. A process for the removal of bound water, liquids or liquors from sludges or slurries by means of electrical energy and an electrical path established through said sludges or slurries releasing said bound water, liquids or liquors and resulting in a volume reduction, and solids suitable for recycling or landfill disposal, the process comprising:
   a) measuring the conductivity of said sludge or slurry;
   b) blending said sludge or slurry with a predetermined amount of electrolyte in a blending chamber;
   c) measuring the conductivity of said sludge and electrolyte;
   d) transporting said sludge and electrolyte to a dewatering chamber;
   e) introducing said sludge and electrolyte into said dewatering chamber, said dewatering chamber having an inlet means and an outlet means;
   f) transporting said sludge and electrolyte through said dewatering chamber by means of convergent conveyor belts between the inlet means of said dewatering chamber and said outlet means of said dewatering chamber;
   g) subjecting said sludge and said electrolyte t, an adjustable source of electrical energy transmitted through said sludge and electrolyte;
   h) removing said water, liquids or liquors from said sludge and electrolyte by means of electrical current passing therethrough;
   i) collecting said water, liquids or liquors in liquid or vapor form;
   j) collecting a dewatered or deliquified sludge at said outlet means of said dewatering chamber.

14. A process in accordance with claim 13 wherein said converging conveyor belts are electrically conductive thereby facilitating the conduction of electrical energy from said adjustable source of electrical energy to said sludge and electrolyte.

15. A process in accordance with claim 14 wherein said source of electrical energy is transmitted to said conductive conveyor belt and away from said conductive conveyor belt to a ground by means of adjacent conductive slider plates positioned on the interior underside of each of said converging conveyor belts, said conductive slider plates having a plurality of apertures therethrough to permit the passage of water, liquids or liquors from said sludge.

16. A process in accordance with claim 13 wherein said converging conveyor belts are non-conductive and said source of electrical energy comprises an electromagnetic source positioned adjacent said convergent conveyor belts, the electromagnetic force associated with one said conveyor belt being of an opposing polarity to the electromagnetic source associated with said second conveyor belt so as to establish an electromagnetic field to drive said waters, liquids or liquors from said sludge.

* * * * *